United States Patent Office 3,479,098
Patented Nov. 18, 1969

3,479,098
HYDRODYNAMIC GAS BEARING ASSEMBLY
John Kerr and Duncan Gay, Glasgow, Scotland, assignors to National Research Development Corporation, London, England, a British corporation
Filed Jan. 19, 1968, Ser. No. 699,083
Claims priority, application Great Britain, Jan. 26, 1967, 4,045/67
Int. Cl. F16c 7/04, 17/16, 29/02
U.S. Cl. 308—9                                    6 Claims

ABSTRACT OF THE DISCLOSURE

A hydrodynamic gas bearing assembly comprising a fixed shaft and a glass sleeve surrounding with clearance the fixed shaft and rotatable about the shaft. Axial movement of the glass sleeve is limited by an arrangement comprising a wall secured to the glass sleeve; the wall having projections located on the axis of rotation and directed, in opposite directions, towards the adjacent shaft end and a fixed wall supported by an arm secured to the shaft at the remote end of the shaft.

---

This invention relates to hydrodynamic gas bearing assemblies.

It is an object of the present invention to provide an improved hydrodynamic gas bearing assembly.

According to the present invention there is provided a hydrodynamic gas bearing assembly including a stationary shaft and a sleeve disposed with clearance for rotation about the shaft, the sleeve being formed of glass.

A sleeve of non-frangible material may surround and be mounted in fixed coaxial relation to the glass sleeve.

The shaft may be formed in two coaxial parts, the outer part being resiliently mounted from the inner part.

Means may be provided for limiting movement of the glass sleeve in the direction of the axis of rotation.

The means for limiting movement of the glass sleeve may include an end member secured to one end of the sleeve and entirely across an end of the shaft, the shaft projecting from the other end of the sleeve, and a fixed stop member located on the side of the sleeve end member remote from the end of the shaft, the fixed stop member being carried by an arm secured to a portion of the shaft projecting from the said other end of the sleeve, the sleeve end member being engageable with the adjacent end of the shaft and with the fixed stop member to limit endwise movement of the sleeve relative to the shaft.

The sleeve end member may have projections directed towards the shaft end and the fixed stop member respectively, said projections being adapted to provide point contact with the shaft and the fixed stop member respectively, the points of contact lying on the axis of rotation of the sleeve.

The fixed stop member may comprise a first wall having an aperture therein through which extends a reduced diameter and portion of the shaft, the first wall being secured in fixed relationship with the shaft, a cylindrical member secured to the first wall and extending over the length of the sleeve and having secured thereto, at its end remote from the first wall, a second wall, the cylindrical member being cut-away over a portion of its length less than the axial length of the sleeve and over a major portion of its circumferential dimenison.

Figure 1:
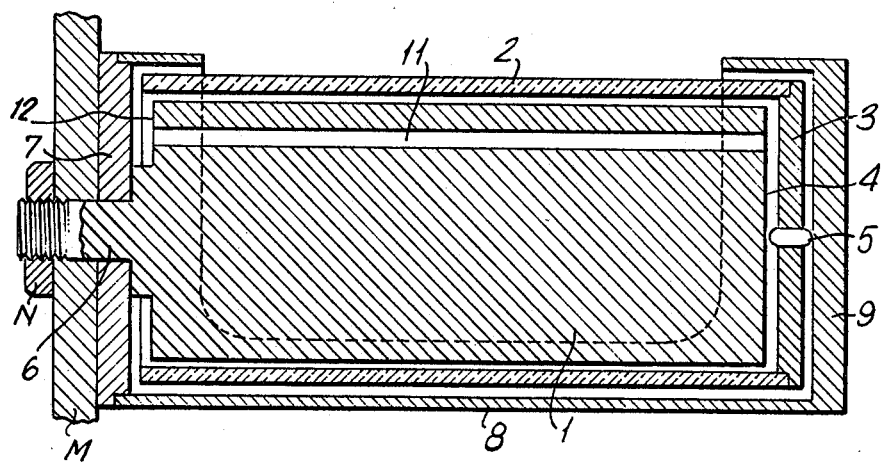
Figure 2:
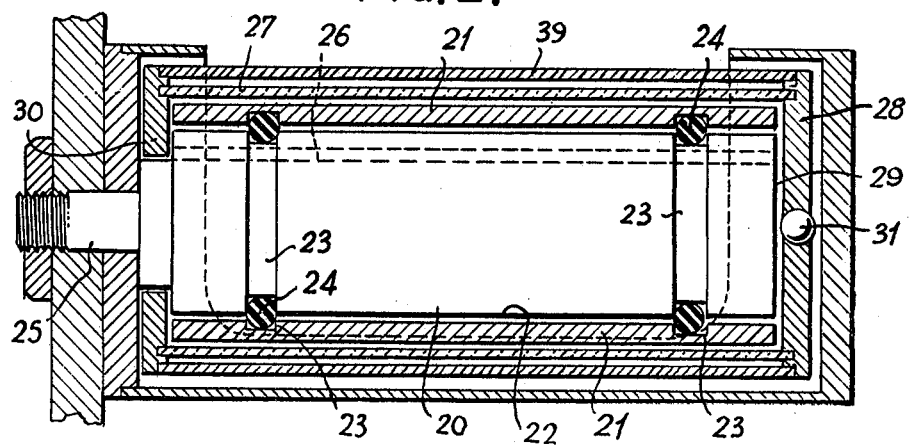

Embodiments of the present invention will now be described, by way of example, with reference to the accompanying drawings of which:

FIGURE 1 illustrates a sectional side view of a hydrodynamic gas bearing assembly according to one embodiment; and FIGURE 2 is a similar view of a second embodiment.

Referring to FIGURE 1 of the accompanying drawings, a bearing assembly includes a fixed steel shaft 1 and a glass sleeve 2 rotatably mounted with clearance on the shaft 1. The sleeve 2, in the particular embodiment being described, is about 1 inch in diameter and 2 inches long. One end of the sleeve 2 has an end wall 3 extending across an adjacent end 4 of the shaft 1. The end wall 3 carries a thrust bearing member in the form of a pin 5 with hemispherical ends. The pin projects from each side of the end wall 3 and the longitudinal axis of the pin is colinear with the axis of rotation of the sleeve 2.

The shaft 1 has a portion 6 projecting from the sleeve 2 which is of reduced diameter compared to the portion within the sleeve 2 and is threaded over a portion of its length. The shaft portion 6 carries a housing including an end wall 7 having an aperture therein through which extends the shaft end portion 6. Secured to the end wall 7 is a cut-away cover 8 extending from the end wall 7 to a position beyond the end 4 of the shaft 1. An end wall 9 is secured to the cylindrical cover 8 at the end thereof remote from the end wall 7. The end wall 9 extends across the end wall 3 of the sleeve 2. The cover 8 is cut away to such an extent that more than 300° of the circumference of the sleeve 2 and about 90 percent of its length is exposed.

The bearing assembly is mounted by passing the reduced diameter shaft portion 6 through an aperture in mounting means illustrated diagrammatically at M in FIGURE 1. The assembly is held to the mounting means by a nut N which bears against the mounting means M and draws a shoulder S on the shaft against the end wall 7 which in turn is drawn against the mounting means M.

The shaft 1 has a bore 11 running parallel to the axis of rotation and extending from the end 4 of the shaft 1 to the end 12 of the larger diameter portion of the shaft 1 adjacent the open end of the sleeve 2.

In use, the sleeve 2 is rotated about the shaft 1 at a sufficiently high speed to cause a hydrodynamic gas bearing to be formed in the clearance between the sleeve 2 and the shaft 1. The bore 11 serves to equalise the pressures at opposite ends of the clearance. During rotation, the sleeve 2 is allowed a limited amount of endwise movement relative to the shaft 1, such movement being limited in one direction by the engagement of the thrust member 5 with the end 4 of the shaft 1 and in the opposite direction by engagement of the thrust member 5 with the end wall 9. The end 4 of the shaft 1 and the wall 9 engageable by the thrust member 5 are both flat and perpendicular to the axis of rotation of the sleeve 2 and thus provide virtually no lateral restraint to the thrust member 5. This is especially important under whirl or out-of-balance load conditions. The end wall 9 is, in effect, supported in a cantilever manner by the cover 8 which, because of its tubular configuration at its opposite ends, provides a relatively high cantilever stiffness in a relatively small space.

The operational speed range may be from not less than a few hundred r.p.m. to tens of thousands of r.p.m. The minimum airborne speed depends upon load, clearance surface finish, roundness and parallelism of the shaft and sleeve bearing surfaces, approximately in that order of importance. The maximum speed depends upon the residual out-of-balance in the sleeve assembly and also on the phenomenon known as half speed whirl. Operation may also be limited by the relative humidity of the surrounding atmosphere for, depending upon the load, it is possible for moisture to accumulate in the clearance space.

The described arrangement has been tested satisfactorily with substantially no measurable wear for over 2,000 starts and stops with 3.5 lbs. radial load, 0.1 lb. trust load, and running at 12,000 r.p.m. The combination of the glass sleeve and hardened steel shaft provides high wear resistance relatively cheaply, and the relatively low mass of the glass sleeve reduces the half-speed whirl problem.

The described arrangement is intended for use as a separator roll in the draw-twisting process for continuous filament fibres, but could also be used as a guide or jockey pulley for belt drives.

The load capacity of the assembly in the radial direction depends principally upon the ability of the assembly to withstand starting and stopping under loaded conditions. If found desirable, the shaft may be drilled so that gas under pressure may be supplied to the region between the shaft and the sleeve so that the shaft and sleeve may be held clear of one another, during stopping and starting, when the rotational speed of the sleeve is too low to create a hydrodynamic gas bearing.

The embodiment of the invention illustrated in FIGURE 2 includes a shaft formed in two parts 20, 21. The first shaft part 20 is of rod form with a cylindrical surface 22 and the second shaft part 21 is of annular sectional form. The internal diameter of the second shaft part 21 is greater than the external diameter of the first shaft part 20. Each of the shaft parts 20, 21 has formed therein two circumferential grooves 23. The two grooves in the first shaft part 20 are disposed one radially opposite each of the two grooves in the second shaft part 21. Disposed one in each of the two opposed pairs of grooves are two O-rings 24 of resilient material.

The shaft includes an end portion 25 of reduced diameter which is threaded over a portion of its length for mounting purposes.

A bore 26 extends between the ends of the shaft part 21.

A glass sleeve 27 is rotatably mounted with clearance on the shaft. The end of the sleeve 27 remote from the reduced-diameter shaft portion 25 is closed by an end wall 28 which extends across the end 29 of the shaft. The end wall 28 extends radially outwards from the glass sleeve 27 and serves to maintain one end of a sleeve 39 of metal or other non-frangible material in fixed location with respect to the glass sleeve 27. The other end of the metal sleeve 39 is maintained in fixed location with the glass sleeve 27 by an annular member 30 which extends radially inwards beyond the radially inner surface of the glass sleeve and overlies a portion of the adjacent end of the shaft.

The metal sleeve 39 serves as a shroud for the glass sleeve and by enveloping the glass sleeve overcomes the danger of flying glass should the glass sleeve break up during use.

The radially inward extension of the annular member 30 assists in excluding dust from the region between the glass sleeve 27 and the shaft.

The end wall 28 carries a thrust bearing member which, in this embodiment, is in the form of a hardened steel ball 31 which stands proud of both surfaces of the wall 28. The diameter of the ball 31 which is normal to the plane of the wall 28 is co-linear with the axis of rotation of the sleeve. At least the portions of the end of the shaft and of the housing against which the ball may bear are both of hardened steel.

The reduced-diameter shaft and portion 25 carries a housing generally similar to the housing of the embodiment illustrated in FIGURE 1 and in view of this similarity, further description will not be given.

The resilient mounting of the shaft portion 21 between which and the sleeve 27 the gas bearing condition is created upon rotation of the sleeves 27, 39, has been found to make the bearing more inherently stable and that after the incept of half-speed whirl, increase of shaft speed causes the whirl effect to reduce and ultimately disappear.

Whilst the metal sleeve surrounding the glass sleeve has been described in an embodiment in which the member on which the shaft bearing surface is formed is resiliently mounted, it is to be understood that the metal sleeve could be included in an arrangement otherwise as illustrated in and described with reference to FIGURE 1 or in other embodiments.

Whilst a pin and a ball have been described as examples of thrust bearing members, it is to be understood that the thrust bearing member may take other forms. If found necessary, the thrust members may be lubricated.

We claim:
1. A hydrodynamic gas bearing assembly comprising:
   a stationary shaft,
   a glass sleeve member coaxial with and disposed about said shaft, said sleeve being of a diameter greater than said shaft such that there is sufficient clearance to permit rotation of said sleeve about said shaft, said shaft having a portion projecting from one end of said sleeve, and
   means adapted to limit movement of said glass sleeve in a direction along its axis of rotation comprising an end member secured to the other end of said glass sleeve and extending across an end of said shaft, a fixed stop member located at the side of said sleeve end member remote from said end of said shaft, and an arm member secured to said portion of said shaft extending from said other end of said sleeve, said fixed stop member being carried by said arm, said sleeve end member being engageable with the adjacent end of said shaft and with said fixed stop member to limit endwise movement of said sleeve relative to said shaft.

2. A hydrodynamic gas bearing assembly as claimed in claim 1, having in addition:
   a sleeve of non-frangible material surrounding and mounted in fixed coaxial relation to the glass sleeve.

3. A hydrodynamic gas bearing assembly as claimed in claim 1, wherein:
   the shaft is formed in two coaxial parts,
   the outer of the two coaxial parts being resiliently mounted from the inner of the two coaxial parts.

4. A hydrodynamic gas bearing assembly as claimed in claim 1, wherein:
   the sleeve end member has projections directed towards the shaft end and the fixed stop member respectively;
   said projections being adapted to provide point contact with the shaft and the fixed stop member respectively;
   said points of contact lying on the axis of rotation of the sleeve.

5. A hydrodynamic gas bearing assembly as claimed in claim 4, wherein:
   said projections of the sleeve end member are formed by a ball retained in the sleeve end member.

6. A hydrodynamic gas bearing assembly as claimed in claim 1, wherein said arm comprises a first wall having an aperture therein;
   said portion of said shaft projecting from said one end of said sleeve being of a reduced diameter extending through said aperture in said wall;
   said first wall being secured in fixed relationship with said shaft;

a cylindrical member secured to said first wall and extending over the length of the sleeve;
said fixed stop member including:
  a second wall;
  said second wall being secured to said cylindrical member at its end remote from said first wall;
  said cylindrical member being cut-away over a portion of its length less than the axial length of the sleeve and over a major portion of its circumferential dimension.

References Cited

UNITED STATES PATENTS

| | | | | |
|---|---|---|---|---|
| 1,980,081 | 11/1934 | Ovington. | | |
| 2,889,474 | 6/1959 | Macks | | 308—9 |
| 3,034,837 | 5/1962 | Barker | | 308—9 |
| 3,121,179 | 2/1964 | Macks | | 308—9 |

MARTIN P. SCHWADRON, Primary Examiner

F. SUSKO, Assistant Examiner